United States Patent [19]
Bahr

[11] Patent Number: 5,265,972
[45] Date of Patent: Nov. 30, 1993

[54] SUPPORT STRUCTURE, AND METHOD OF CONNECTING ONE STRUCTURAL ELEMENT TO ANOTHER STRUCTURAL ELEMENT

[75] Inventor: Frank Bahr, Porta Westfalica, Fed. Rep. of Germany

[73] Assignee: Phoenix Mecano Holding AG, Stein am Rhein, Switzerland

[21] Appl. No.: 816,979

[22] Filed: Jan. 6, 1992

[30] Foreign Application Priority Data

Jan. 7, 1991 [DE] Fed. Rep. of Germany ... 9100099[U]

[51] Int. Cl.[5] .............................................. F16B 17/00
[52] U.S. Cl. .................................. 403/252; 403/260; 403/230; 403/403; 52/655.1
[58] Field of Search ............... 403/252, 258, 260, 187, 403/7, 403, 230, 200, 263, 254, 255, 189, 190, 174, 175, 194; 256/65, 69; 52/643

[56] References Cited

U.S. PATENT DOCUMENTS

| | | | |
|---|---|---|---|
| 2,972,495 | 2/1961 | Yalen | 403/258 |
| 3,349,538 | 10/1967 | Crossman | 256/59 |
| 3,816,011 | 6/1974 | Biebuyck et al. | 403/260 X |
| 4,747,248 | 5/1988 | Fahs | 403/403 X |
| 4,775,259 | 10/1988 | Shell | 403/252 |

FOREIGN PATENT DOCUMENTS

| | | | |
|---|---|---|---|
| 2545549 | 6/1976 | Fed. Rep. of Germany | 403/189 |
| 3328142 | 2/1985 | Fed. Rep. of Germany | 403/172 |
| 3438773 | 4/1986 | Fed. Rep. of Germany | 403/172 |

*Primary Examiner*—Randolph A. Reese
*Assistant Examiner*—Harry C. Kim
*Attorney, Agent, or Firm*—Henry M. Feiereisen

[57] ABSTRACT

A support structure includes a support bar and at least one section bar which is mounted to the support bar and includes two inner chambers which define a common transverse axis coincidental with the longitudinal axis of the support bar and which receive fixing screws for allowing attachment of the section bar to the support bar.

10 Claims, 2 Drawing Sheets

SUPPORT STRUCTURE, AND METHOD OF CONNECTING ONE STRUCTURAL ELEMENT TO ANOTHER STRUCTURAL ELEMENT

BACKGROUND OF THE INVENTION

The present invention refers to a support structure and to a method of connecting one structural element to another structural element. In particular, the present invention is concerned with a support structure of the type including a section bar mounted to a support bar via a screw connection.

It is known to provide a support structure by mounting an end face of the section bar to a longitudinal side of the support bar by means of screws, with the support bar having longitudinal sides provided with central longitudinal grooves, and with the screws being secured transversely in the support bar. The screw is threaded in an inner chamber of the section bar, with the inner chamber extending in longitudinal direction, and with the head of the screw bearing upon the support bar.

In such a conventional support structure, the screw is retained within the support bar by supporting the head of the screw with a washer or supporting disk or sliding block which is arranged in the undercut longitudinal groove facing the section bar. The screw is threadably engaged in an inner chamber, which is arranged concentrically to the mid-axis of the section bar by means of a suitable tool such as a screw driver which is inserted in a respective transverse bore in the support bar.

Because of the required precise central attachment, such a support structure or type of connection has only a relative small load carrying ability, and in particular is not sufficiently able to compensate torsional loads which means that the section bar is not secured against rotation when being mounted to the support bar. A further drawback is the necessity to insert the screw together with the supporting disk from the open end of the support bar which makes it difficult to accurately position the section bar and the support bar relative to each other. Also, a subsequent installation of a section bar between neighboring sections bars becomes very difficult because it requires complete dismantling of at least one section bar in order to allow the screw and the supporting disk to be inserted from the open end of the support bar for mounting the new section bar thereto.

A support structure of this type is thus difficult to make and complicated to handle so that its application becomes uneconomic.

SUMMARY OF THE INVENTION

It is an object of the present invention to provide an improved support structure obviating the afore-stated drawbacks.

In particular, it is an object of the present invention top provide an improved support structure in which the connection of a section bar to the support bar is easy and economical and yet the capability to withstand loads is greatly improved.

These objects and others which will become apparent hereinafter are attained by providing the section bar with two parallel and spaced inner chambers which define a transverse axis extending coincidental with the longitudinal axis of the support bar and by threadably engaging a screw into each inner chamber of the section bar, with at least one screw being secured in the support bar.

A support structure of this type allows a considerably facilitated attachment of the section bar to the support bar because the bore for allowing insertion of the screws can be drilled in the support bar in situ i.e. when connecting the section bar to the support bar, and the screws can then be guided through the already positioned support bar and affixed to the section bar.

In accordance with the teaching of the present invention, the section bar is secured against rotation by inserting two screws into the section bar, with at least one screw being utilized for attaching the section bar to the support bar by securing the head of the screw in the inner chamber against a shoulder of the bore.

According to one embodiment of the present invention, in which one section bar is to be connected to the support bar, both screws may be used for attachment, with their head arranged in the respective inner chambers of the support bar. In accordance with another embodiment in which two section bars are to be connected in a same cross sectional plane of the support bar at neighboring longitudinal sides thereof, each section bar may be connected by one screw which is secured in the support bar and has a screw head received in an inner chamber of the section bar while the screw head of the other screw may be received in a respective longitudinal groove of the support bar. Suitably, the diameter of the screw head of the other screw approximately equals the width of the longitudinal groove.

In comparison to conventional support structures, the support structure in accordance with the present invention has a much improved static load carrying ability.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
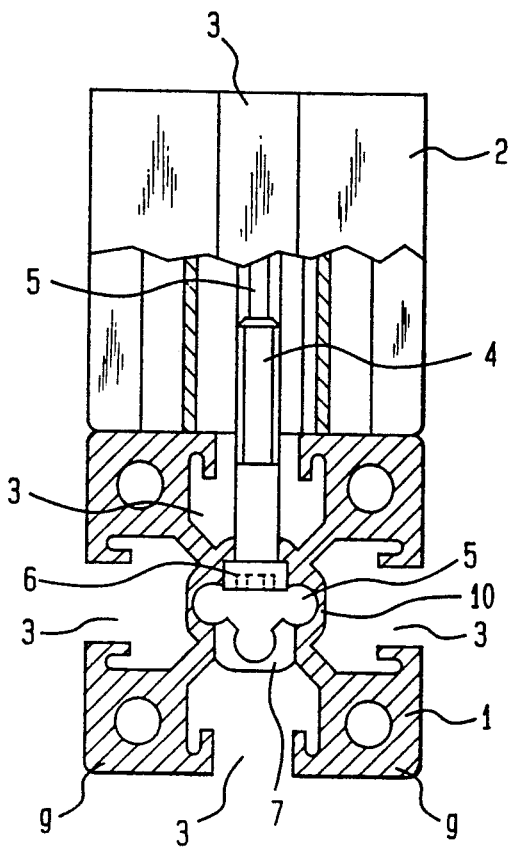
FIG. 1 is a fragmentary cross sectional view of one embodiment of a support structure according to the present invention, with a structural element serving as support bar and another like structural element being mounted thereto.

Throughout all the FIGURES, the same or corresponding elements are always indicated by the same reference numerals.

Figure 2:
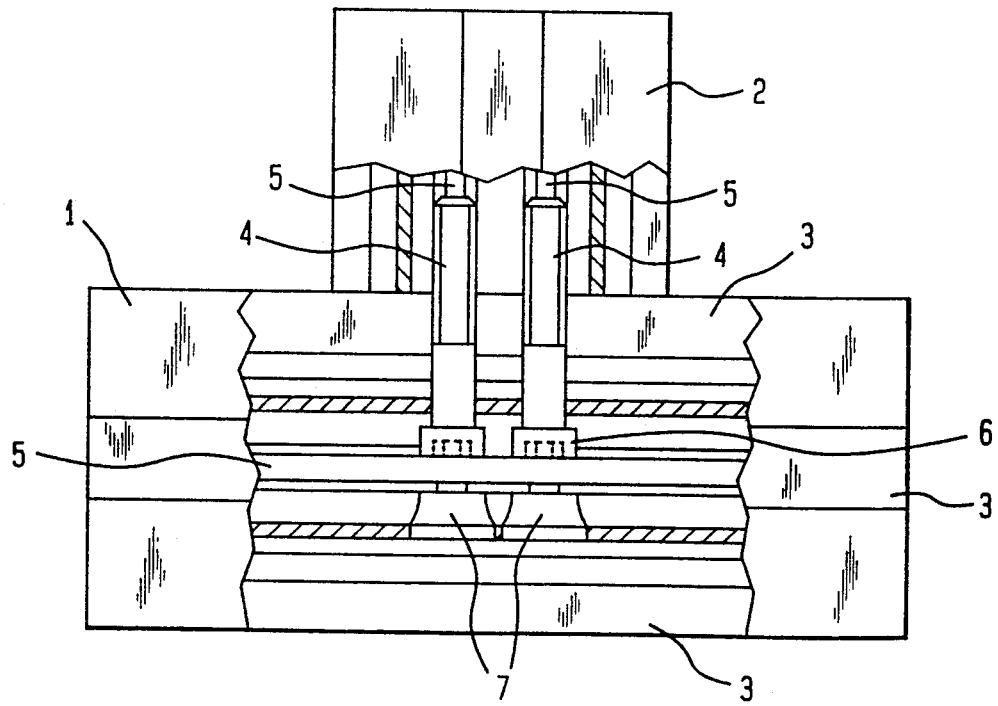
FIG. 2 is a fragmentary, partially sectional longitudinal view of the support structure of FIG. 1.

Referring now to the drawing and in particular to FIGS. 1 and 2, there are shown a cross sectional view and a longitudinal view of one embodiment of a support structure according to the present invention, with a structural element serving as support bar 1 and another like structural element serving as section bar . The section bar 2 is mounted with one end face thereof to a longitudinal side of the support bar 1 by means of suitable fixing screws 4. It will be appreciated by persons skilled in the art that for sake of simplicity, the following description differentiates between support bar and section bar even though these elements are essentially identical. In the nonlimiting example of the drawing, the support bar 1 and the section bar 2 are of square cross-sectional area.

Each structural element, i.e. support bar 1 and section bar 2, includes an outer wall 9 which is provided with a central undercut longitudinal groove 3 along each longitudinal side thereof, and a central piece 10 extending inwardly from the outer wall 9. The central piece 10 is provided with four cirumferentially and uniformly spaced inner chambers 5 which extend parallel to the longitudinal grooves 3.

The inner chambers 5 of the support bar 1 and the section bar 2 are so arranged that upon connection of a section bar 2 to the support bar 1, two inner chambers 5 of the section bar 2 extend coincidental with the longitudinal axis of the support bar 1. In this manner, the inner chambers 5 are precisely positioned in central alignment with the pertaining longitudinal groove 3 of the support bar 1.

As is further shown in FIGS. 1 and 2, the support bar 1 includes bores 7 which are arranged in prolongation of the longitudinal axis of each inner chamber 5 of the section bar 2 for allowing insertion of the fixing screws and are drilled in the support bar 1 in situ i.e. when attaching a section bar 2 to the support bar 1. The bores 7 are of shouldered or step-shaped configuration and include an entrance opening which is distant to the section bar 2 and has a diameter exceeding the opposing exit opening which is slightly greater than the shank diameter of the fixing screw 4 and is located in the area facing the section bar 2. Thus, when being inserted for mounting the section bar 2 to the support bar 1, the fixing screws 4 are guided through the entrance opening of the bores 7 and through the center piece 10, with the shank threadably engaged in the inner chambers 5 of the section bar 2, and with the head 6 bearing upon a receiving surface within the respective inner chamber 5 against the shoulder of the bore 7.

By using suitable tools, such as drilling jigs or the like, the bores 7 can be precisely drilled when the section bar 2 is accurately positioned relative to the support bar 1.

As shown in particular in FIG. 2, the section bar 2 is mounted to the support bar 1 by two fixing screws 4 which extend off-center. In this manner, the section bar 2 is secured against rotation and the overall support structure has a considerably improved load carrying capability, in particular with regard to torsional loads.

Figure 3:
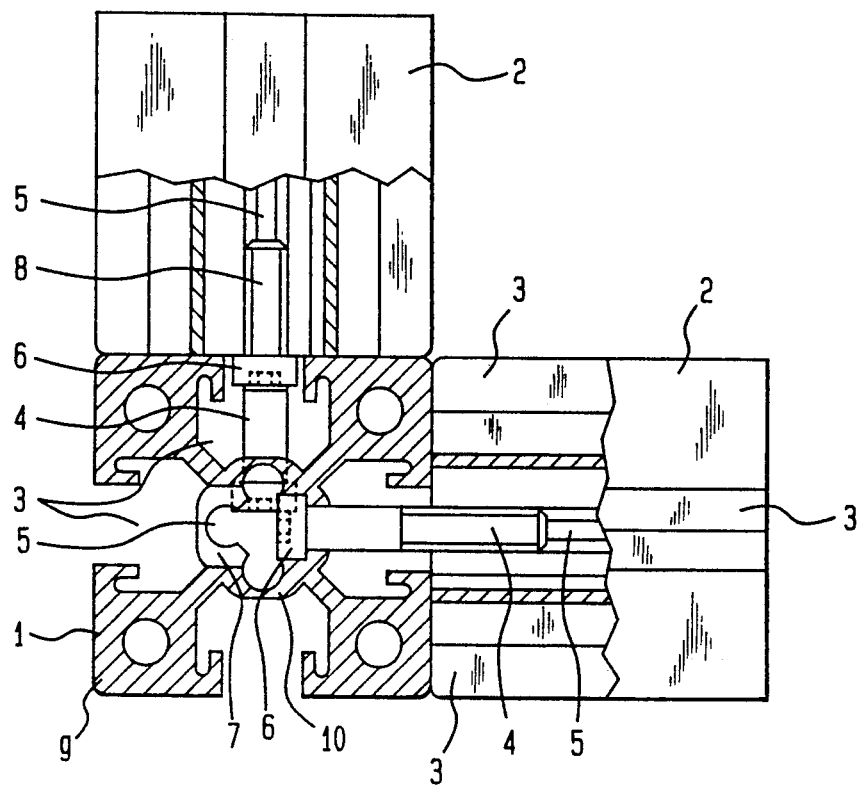
FIG. 3 is a fragmentary cross sectional view of another embodiment of a support structure according to the present invention, with a structural element serving as support bar and two other like structural elements being mounted thereto.
Figure 4:
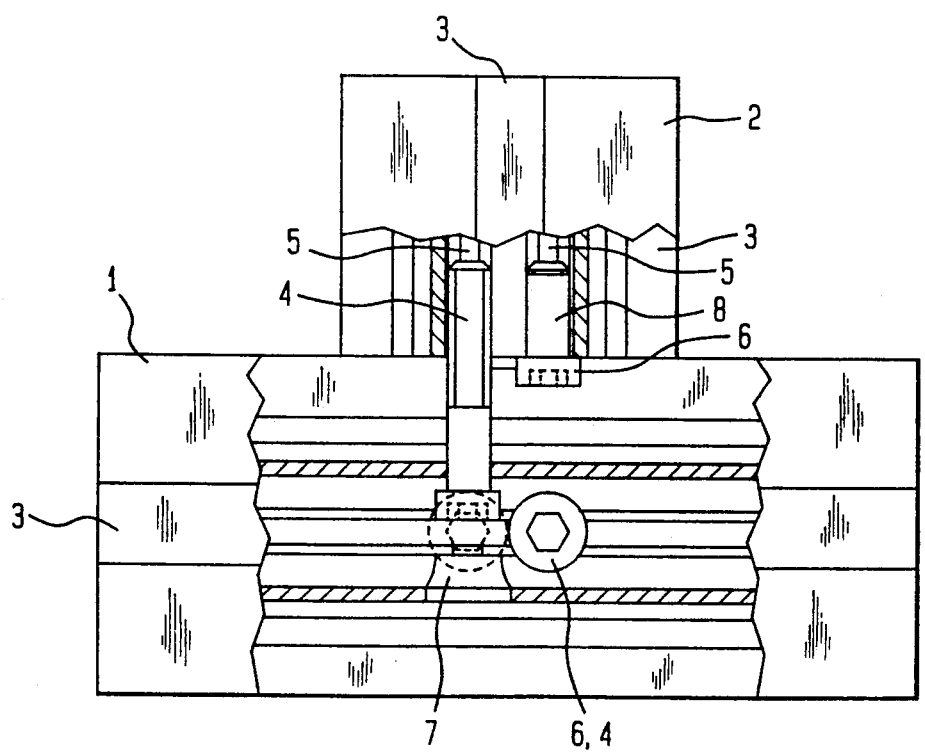
FIG. 4 is a fragmentary, partially sectional longitudinal view of the support structure of FIG. 3.

Turning now to FIGS. 3 and 4, there are shown a cross sectional view and a longitudinal view of another embodiment of a support structure according to the present invention, with two section bars 2 mounted to two neighboring longitudinal sides of the support bar 1 so that the section bars 2 extend perpendicular to each other in a common cross sectional plane of the support bar 1. In order to prevent the section bars 2 from a rotation relative to the support bar 1, each section bar 2 is connected to the support bar 1 by one fixing screw 4 in a same manner as described with reference to the embodiment of FIGS. 1 and 2 and by another screw 8 which is threadably engaged in such a manner that its shank portion extends in the respective inner chamber 5 of the section bar 2 while its cylindrical head portion 6 bears upon the end face of the section bar 2, and thus is received in the pertaining longitudinal groove 3 of the support bar 1. In this embodiment, only one bore 7 in prolongation of the inner chambers 5 of each section bar 2 is of stepped configuration while the other bore 7 is continuous to allow the respective fixing screw 4 to pass therethrough and to rest with its head 6 in the corresponding longitudinal groove 3. Suitably, the screw head 6 of the fixing screw 8 has a diameter which approximately equals the width of the longitudinal groove 3 (see FIG. 3).

As shown in FIG. 4, the section bars 2 are mounted to the support bar 1 in such manner that the screw 8 of one section bar 2 is in alignment with the screw 4 of the other section bar 2 so that the screw 4 can be easily inserted in order to connect the section bar 2 with the support bar 1.

While the invention has been illustrated and described as embodied in a support structure, it is not intended to be limited to the details shown since various modifications and structural changes may be made without departing in any way from the spirit of the present invention.

What is claimed as new and desired to be protected by Letters Patent is set forth in the appended claims:

I claim:

1. A support structure, comprising:
    a support element defining a longitudinal axis and including longitudinal sides provided with central longitudinal grooves;
    a section element arranged for connection to said support element along a longitudinal side of said support element, said section element defining a longitudinal axis extending perpendicular to the longitudinal axis of said support element and accommodating spaced inner chambers, with two inner chambers of said section element defining a common central transverse axis which extends coincidental with the longitudinal axis of said support element so as to define with said longitudinal axis of said support element a common plane; and
    screw means for connecting said section element to said support element, said screw means extending in said plane and threadably engaging with two inner chambers of said section element with said screw means including at least one screw threadably engageable from outside in a bore of said support element, with said bore traversing said support element and extending in prolongation of one of said inner chambers of said section element, said screw having a head resting in a counterbore of said support element.

2. A support structure as defined in claim 1 wherein said screw means includes two screws respectively threadably engaged in said two inner chambers of said section element and secured in said support element.

3. A support structure as defined in claim 1 wherein two section elements are connected along adjacent longitudinal sides of said support element, each of said section elements being connected to said support element by one screw threadably engaging one of said two inner chambers and secured in said support element, and by another screw threadably engaging the other one of said two inner chambers of said section element, with the head of said other screw projecting in a pertaining longitudinal groove of said support element.

4. A support structure as defined in claim 3 wherein said longitudinal groove has a width, said head of said other screw having a diameter approximately corresponding to the width of said longitudinal groove.

5. A support structure as defined in claim 3 wherein said other screw for one of said section elements is in alignment with said one screw for the other one of said section element.

6. A support structure as defined in claim 1 wherein said support element is provided with a bore in prolongation of each inner chamber of said section element for receiving said screw means, said bore being step-shaped to define a shoulder for defining said counterbore in an area facing said section element.

7. A support structure, comprising:
   a structural element which is adapted for connection to at least one other like structural element and defines a longitudinal axis, each structural element having an outer wall provided with central longitudinal grooves, and a central piece extending inwardly from said outer wall and accommodating spaced inner chambers extending parallel to said longitudinal grooves, said structural elements being positioned in such a manner that two inner chambers of one structural element define a common central transverse axis which extends coincidental with a longitudinal axis of said other structural element so as to define with said longitudinal axis of said other structural element a common plane; and
   screw means for connecting said structural elements with each other, said screw means extending in said plane and threadably engaging said two inner chambers of said one structural element, with said screw means including at least one screw threadably engageable from outside in a bore of said other structural element and secured in an inner chamber of said other structural element, with said bore traversing said other structural element and extending in prolongation of one of said inner chambers of said one structural element.

8. A support structure as defined in claim 7 wherein said screw means includes one screw threadably engaging one of said two inner chambers and secured in said other structural element, and another screw threadably engaging the other one of said two inner chambers and retained in a respective longitudinal groove of said other structural element.

9. A method of connecting one structural element to another structural element, with each structural element defining a longitudinal axis and having an outer wall provided with central longitudinal grooves, and a central piece extending inwardly from said outer wall and accommodating at least two opposing inner chambers extending parallel to the longitudinal grooves, comprising the steps of:
   placing one structural element along a longitudinal side of another structural element such that said inner chambers of said one structural element define a common central transverse axis which extends coincidental with the longitudinal axis of said other structural element so as to define with said longitudinal axis of said other structural element a common plane;
   drilling a bore through said central piece of said other structural element in prolongation of each inner chamber of said one structural element, with each bore being step-shaped to provide a counterbore in an area facing said one structural element; and
   inserting a fixing screw through each bore in said other structural element and threadably engaging the inner chambers of said one structural element with said fixing screw having a head resting in said counterbore.

10. A method of connecting one structural element to two further structural elements, with each structural element having an outer wall provided with central longitudinal grooves, and a central piece extending inwardly from said outer wall and accommodating at least two opposing inner chambers extending parallel to the longitudinal grooves, comprising the steps of:
    placing each of said further structural elements along a longitudinal side of said one structural element such that said inner chambers of each further structural element define a common transverse axis which extends coincidental with a longitudinal axis of said one structural element;
    drilling a bore through said central piece of said one structural element in prolongation of each inner chamber of each further structural element, with one of said bores being step-shaped to define a shoulder in an area facing each further structural element; and
    inserting a fixing screw through each bore in said one structural element and threadably engaging the inner chambers of each further structural element, with one fixing screw having a head bearing against said shoulder in said one bore and with another fixing screw having a head retained in a respective longitudinal groove of said one structural element.

* * * * *